United States Patent
Luers

(10) Patent No.: US 8,086,252 B2
(45) Date of Patent: Dec. 27, 2011

(54) METHOD AND ARRANGEMENT FOR LOCATING A MOBILE TERMINAL IN A MULTICELL RADIO ARRANGEMENT

(75) Inventor: Jürgen Luers, Borchen (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 970 days.

(21) Appl. No.: 11/991,033

(22) PCT Filed: Aug. 17, 2006

(86) PCT No.: PCT/EP2006/065409
§ 371 (c)(1),
(2), (4) Date: Feb. 26, 2008

(87) PCT Pub. No.: WO2007/025870
PCT Pub. Date: Mar. 8, 2007

(65) Prior Publication Data
US 2009/0149191 A1  Jun. 11, 2009

(30) Foreign Application Priority Data
Aug. 31, 2005 (DE) .......................... 10 2005 041 453

(51) Int. Cl.
*H04W 24/00* (2009.01)
(52) U.S. Cl. .................................. 455/456.5; 455/456.2
(58) Field of Classification Search ..... 455/456.1–456.6
See application file for complete search history.

(56) References Cited

U.S. PATENT DOCUMENTS

| | | | |
|---|---|---|---|
| 5,508,707 A * | 4/1996 | LeBlanc et al. ............... | 342/457 |
| 5,581,804 A * | 12/1996 | Cameron et al. ........... | 455/456.1 |
| 5,666,662 A | 9/1997 | Shibuya | |
| 5,883,598 A * | 3/1999 | Parl et al. ...................... | 342/457 |
| 5,903,844 A | 5/1999 | Bruckert | |
| 6,006,097 A | 12/1999 | Hoernfeldt | |
| 6,195,556 B1 | 2/2001 | Reudink et al. | |
| 6,289,211 B1 | 9/2001 | Koorapaty et al. | |
| 6,549,775 B2 * | 4/2003 | Ushiki et al. ............... | 455/432.1 |
| 6,839,560 B1 | 1/2005 | Bahl | |
| 7,430,421 B2 * | 9/2008 | Park .......................... | 455/456.1 |
| 2002/0098852 A1 | 7/2002 | Goren | |
| 2003/0119524 A1 | 6/2003 | Carlsson | |
| 2004/0207510 A1 | 10/2004 | Buchner | |
| 2005/0096068 A1 | 5/2005 | Bahl et al. | |

FOREIGN PATENT DOCUMENTS

| | | |
|---|---|---|
| DE | 102007057563 A1 | 6/2009 |
| EP | 0 893 930 A2 | 1/1999 |
| EP | 1 513 290 A1 | 3/2005 |
| WO | 2010086188 A1 | 8/2010 |

* cited by examiner

*Primary Examiner* — Steven Lim

(57) ABSTRACT

A method and system for locating a mobile terminal in a multicell radio system are provided. A plurality of radio base stations detect the field strength of a data transmission of the mobile terminal and the location of the mobile terminal is determined the values are provided. The mobile terminal is switched into an active state, then a plurality of the radio base stations are set to the radio channel used by the mobile terminal to be located, and the mobile terminal is prompted to emit a response message as a result of the communication of a test data transmission. The received field strength of the received response message is measured by the radio base stations and communicated to a central device, after which the location of the mobile terminal is determined by the central device on the basis of the measured values.

20 Claims, 1 Drawing Sheet

METHOD AND ARRANGEMENT FOR LOCATING A MOBILE TERMINAL IN A MULTICELL RADIO ARRANGEMENT

CROSS REFERENCE TO RELATED APPLICATIONS

This application is the US National Stage of International Application No. PCT/EP2006/065409, filed Aug. 17, 2006 and claims the benefit thereof. The International Application claims the benefits of German application No. 102005041453.2 DE filed Aug. 31, 2005, both of the applications are incorporated by reference herein in their entirety.

FIELD OF INVENTION

The invention relates to a method for locating a mobile terminal in a multicell radio arrangement and to an arrangement for locating a mobile terminal.

BACKGROUND OF INVENTION

In modern communication environments, there is a frequent requirement to locate a user and his associated communication terminal, that is to say to determine his position. In line-switching communication networks, for example in "traditional" telephone systems, one specific connection (telephone number) is generally permanently associated with one specific location (for example a connecting box, "connection position" or a room number), and the associated terminal can therefore easily be located. In contrast, other terminals, particularly those operated without the use of wires, are mobile and therefore cannot be associated with a specific location all the time. Particularly in multicell radio arrangements, for example GSM networks, WLAN arrangements, DECT multicell arrangements etc., the location of a mobile terminal is not simply restricted to the radio area of one transmitter (radio base station), but it may be operated by so-called roaming at any given point throughout the entire multicell radio network (radio arrangement).

In order to find the position of a mobile terminal such as this, it is known to use the network to which the radio base stations are connected (DS=distribution system) to find that radio base station which is associated with the mobile terminal at the time in question. The position of the mobile terminal can therefore be limited at least to the area which is covered by the relevant radio base station.

For more accurate location of a mobile terminal, various manufacturers (for example Aruba Networks, Newbury Networks) offer a multiplicity of measurement stations which are distributed in the form of a grid over the possible area of operation of the mobile terminal and each measure the received field strength with which the mobile terminal being searched for can be received at the various positions of the measurement stations. Since the received field strength generally decreases the further the mobile terminal is away from the respective measurement point (whose position is known), a form of triangulation can be used to calculate, or at least to estimate, the position of the mobile terminal from a plurality of measured values from different measurement stations.

The document U.S. Pat. No. 6,839,560 B1 Bahl et al. "Using a derived table of signal strength data to locate and track a user in a wireless network" discloses a method in which the radio base stations record the respective received field strength of a transmission from a mobile terminal, and in which the measured values are compared with a reference table, so that the position of the mobile terminal is determined on the basis of the closest table entries.

The document US 2002/0098852 A1 Goren et al. "Methods and apparatus for identifying asset location in communication networks" likewise discloses a method and an arrangement for locating mobile terminals. In this case, essentially, the propagation time differences and the different reception phase angles of a transmission from the mobile terminal, as well as the various received field strengths of this transmission, are determined at various reception locations and are used to locate the mobile terminal (in this case generally an RFID tag on a mobile object). Specific instruments (TOA estimation device; TOA=time of arrival) are used at the reception locations and provide each of the received transmissions with a "time stamp", in which case correspondingly precise synchronization between the instruments is necessary, in order to compare the respective time stamps.

In addition to the described process of locating mobile terminals, corresponding methods can also be used to record radio devices. For example, it is known in WLAN radio networks for radio base stations to be provided with knowledge about their adjacent radio base stations or about a "foreign" radio network by the recording radio base station switching the receiving mode for a time period for each available radio channel, and thus recording the so-called beacons, that is to say radio beacons, of the adjacent radio base stations. The beacons are in this case radio signals which are transmitted periodically and on the basis of which the respective radio base station can be identified. Nearby radio base stations can be recorded on the basis of the received field strength of the respective "beacons" recorded in this way, thus making it possible to avoid use of the radio channels that they are using, thus resulting in interference-free operation.

SUMMARY OF INVENTION

The described methods for recording and locating mobile terminals are associated with disadvantages because mobile terminals, in contrast to the—stationary—radio base stations, generally do not transmit any periodic identification signals or other transmissions when they are not actively transmitting data. Admittedly, mobile terminals can in many cases be configured such that they transmit such radio signals continuously or quasi-continuously, although this disadvantageously increases the energy consumption of the mobile terminals. Furthermore, the separate measurement devices (measurement stations) which are used to locate mobile terminals represent an investment that must additionally be provided for this purpose.

One object of the present invention is therefore to reduce or to avoid the investment and adaptations required for locating mobile terminals, and to improve the process of locating mobile terminals in multicell radio arrangements with a multiplicity of radio channels.

The object is achieved by a method and by an arrangement as claimed in the independent claims.

The method which is used to achieve the object in this case provides that, in order to locate a mobile terminal in a multicell radio arrangement having a plurality of radio base stations, the received field strength of at least one data transmission from the mobile terminal is recorded at a plurality of measurement points, and this received field strength is transmitted to a central device, for the evaluation of the measured values, where it is processed to determine the position. In this case, a multichannel radio data network is used as the multicell radio arrangement, for example a WLAN network, with the radio base stations being used for the measurement points.

In this case, the mobile terminal is switched to an active state, and a plurality of the radio base stations are set to the radio channel being used by the mobile terminal to be located. A data transmission to the mobile terminal excites it to transmit a response message, on the basis of which the received field strength which can be measured by this response message is recorded at the radio base stations that have been set to the corresponding radio channel, transmitted to the central device, and is used there to find the position of the mobile terminal. This method makes it possible to locate even those appliances, that is to say mobile terminals, which are being operated passively ("power-saving mode"), in which case the radio base stations which exist in any case can be used to record the received field strengths. Switching to the respective radio channel of the mobile terminal to be located means that the mobile terminal can be located even in those situations in which a plurality or all of the radio base stations in whose reception area the mobile terminal is arranged are using different radio channels. This avoids the same radio channel having to be selected all the time in all the radio base stations in the multicell radio arrangement for location purposes, which, although technically feasible, would, however, lead to a reduced data throughput in the radio arrangement.

The solution to the problem also envisages an arrangement for locating a mobile terminal, using a multicell radio arrangement having a plurality of radio base stations and a plurality of radio channels, with the radio base stations and the mobile terminal each being associated with one of the radio channels. In this case, the radio base stations are each designed to record a received field strength of a data transmission which is transmitted from the mobile terminal, and the radio base stations are designed to transmit a data transmission to the mobile terminals, with the mobile terminal being designed to transmit a response data transmission. The radio base stations are designed to be temporarily switched to the radio channel associated with the mobile terminal, and the radio base stations are designed to transmit the respectively recorded received field strength of the response message to a central device. In this case, the central device is designed to determine the location of the mobile terminal on the basis of the transmitted received field strengths. An arrangement such as this means that it is possible to locate a mobile terminal even in those multicell radio arrangements in which the various radio base stations are used in different radio channels. In this case, there is no need to install a measurement infrastructure, since the radio base stations are themselves used for the measurement process. In order to locate mobile terminals which are in a rest state (power-saving mode), the mobile terminal may, for example, be activated by a data transmission that is waiting for the mobile terminal being indicated in the "beacon" of the radio base station associated with that mobile terminal.

Advantageous refinements of the method according to the invention are specified by the dependent patent claims.

The features and advantages described in this case also apply in the same sense to the arrangement according to the invention.

The regular operation of the radio base stations and thus of the multicell radio arrangement is reproduced as quickly as possible when the radio base stations which have been switched to a different radio channel for the measurement are switched back to their original radio channel once the measurement has been carried out (switched back), and any data transmissions which may have been interrupted for the measurement process are continued.

In those situations in which the mobile terminal is in a rest state (inactive) (for example a power-saving mode) before the measurement (determination) of its position, it can easily be activated by notifying a data transmission for this mobile terminal. This expediently happens by setting an appropriate flag for this mobile terminal in the "beacon" of one or more radio base stations. If the mobile terminal carries out a reception activity periodically, the beacon is received and evaluated, so that the mobile terminal then starts a dialog with the radio base station and is thus activated. Dependent on the configuration of the mobile terminal, it may be necessary to use further data transmissions, for example test data transmissions, or the like to prevent the mobile terminal from switching back again to a rest state, and therefore not being ready to transmit a data transmission which may be used to locate it.

The normal operation of the radio base stations may be interrupted for location purposes and for the radio channel switching associated with this. In this case, the central device which initiates the location process, or else each radio base station, can be configured so as to suppress switching of the radio channel and/or interruption of normal operation for location purposes in those cases in which data transmission, and possibly even only a high-priority data transmission, is currently being carried out by the respective radio base station.

The method can be used not just for locating mobile terminals, but also for recording mobile terminals, that is to say it is first of all possible to use the method to find out whether and which mobile terminals are located in the radio area of one or more/all of the radio base stations. Appropriate test messages, that is to say for example multicast/broadcast messages, are sent for this purpose via one or more radio base stations, with this being done on all relevant radio channels for recording without any gaps. In this case, the recording and location can either be carried out in two different "runs", or else this may be done in a combined form by means of a single recording process.

BRIEF DESCRIPTION OF THE DRAWINGS

Exemplary embodiments of the method according to the invention will be explained in the following text with reference to the drawing. They should be used at the same time to explain an arrangement according to the invention.

In this case, the single FIGURE shows a multicell radio arrangement having a plurality of radio base stations, a central device and a mobile terminal.

DETAILED DESCRIPTION OF INVENTION

Figure 1:
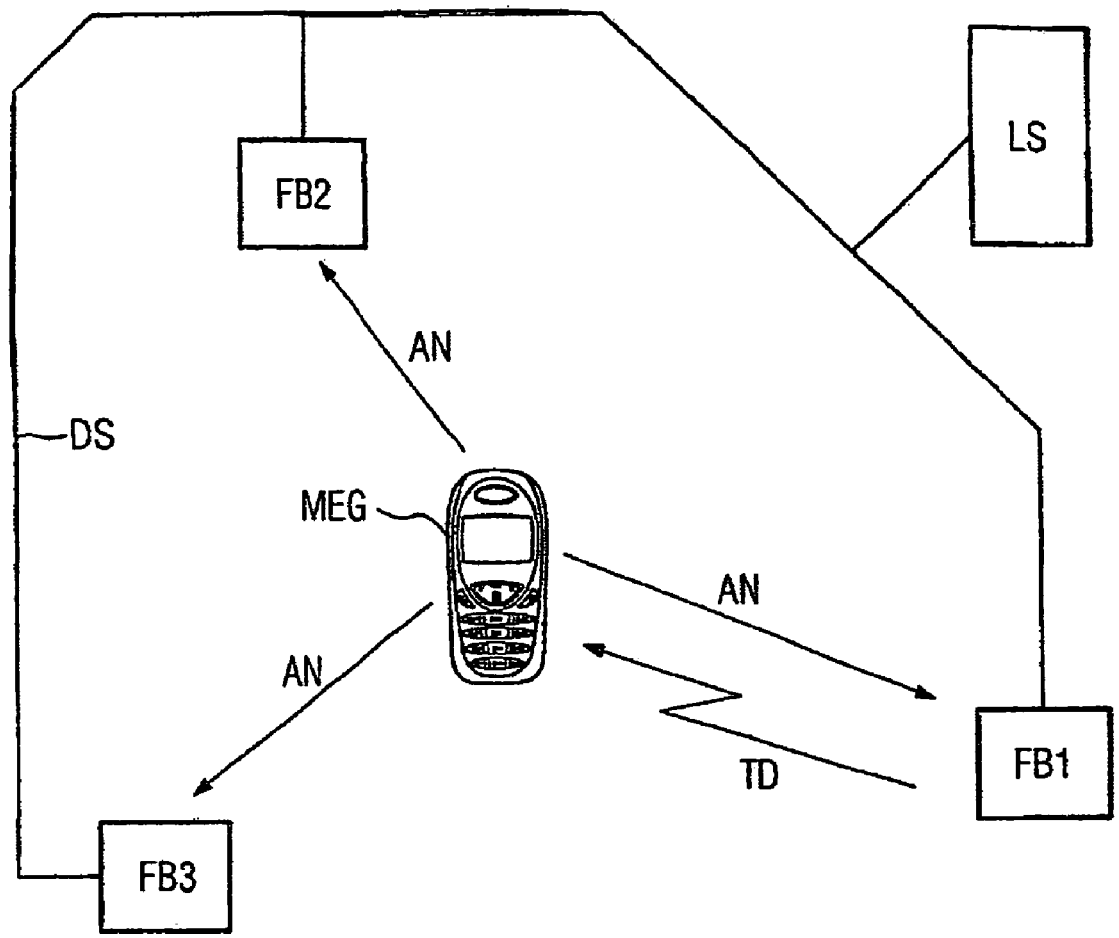

The FIGURE shows a WLAN network to the IEEE Standard 802.11 as a multicell radio arrangement. In this network, the radio base stations FB1, FB2, FB3 (so-called access points) and a central device LS (location server) are connected to one another via a data network DS (distribution system), a local area network based on the Internet Protocol. The FIGURE also shows a mobile terminal MEG, for example a so-called PDA (personal digital assistant), with WLAN transmitting/receiving device.

The radio base stations FB1, FB2, FB3 are designed such that they can be instructed by the central server LS to signal to the central server LS the received field strength with which a mobile terminal MEG is received. In addition, the radio base stations FB1, FB2, FB3 may be instructed by the central server LS to temporarily change to an undefined radio channel of the WLAN standard being used.

It is, of course, also possible to use a different multicell radio arrangement with associated mobile terminals rather than the IEEE Standard 802.11 WLAN considered here, for example a GSM network, a multicell DECT network (DECT multicell), a UMTS network, or the like.

The radio base stations FB1, FB2, FB3 transmit a regular signal (beacon) by means of which they can be identified. A radio base station FB1, FB2, FB3 can embed a message in the beacon, indicating to a mobile terminal MEG which is registered with the respective radio base station FB1, FB2, FB3 as to whether there is a need to transmit data to this mobile terminal MEG.

The mobile terminal MEG can assume various operating modes, inter alia an "active" and an "inactive" operating mode. In the inactive operating mode, frequently also referred to as the power-save mode, the mobile terminal MEG does not transmit and in addition switches its receiver on only sporadically, for example for a few milliseconds every two seconds. During this short reception phase, the mobile terminal MEG checks whether the beacon of the radio base station, in this case the radio base station FB1, can be received on the radio channel assigned to it. If this is not the case, the mobile terminal MEG assumes that the link to "its" radio base station FB1 has been interrupted, and initiates appropriate measures, for example a search for a suitable different radio base station FB2, FB3. However, if the beacon can be received, the mobile terminal MEG also checks whether there is any data that is to be received from this radio base station FB1. If this is the case, this data is requested from the radio base station FB1, and the mobile terminal MEG remains in the active mode, that is to say ready to receive, for a predefined time (minimum time interval). If no waiting data is indicated, the mobile terminal MEG immediately changes back to the inactive state.

If a user (not shown here) wishes to find the position of the mobile terminal MEG, it sends an appropriate request message to the central device LS, for example via the data network DS. This request message comprises a designation or an address, for example an IP address (IP=Internet Protocol) for the mobile terminal MEG being searched for. The central device LS now checks, likewise using request messages via the data network DS, with the radio base stations FB1, FB2, FB3 to determine whether the defined mobile terminal MEG is currently associated with one of these radio base stations FB1, FB2, FB3; in this case, it is also said that it is "registered" to one of the radio base stations FB1, FB2, FB3. In this case, the result is that the mobile terminal MEG being searched for is currently associated with the radio base station FB1, and that the mobile terminal MEG, and therefore the radio base station FB1 as well, are set to a first radio channel. In contrast to this, the second radio base station FB2 is set to a second radio channel, and the radio base station FB3 is set to a third radio channel. However, in the radio network under consideration here, it is also possible for a plurality of adjacent radio base stations FB1, FB2, FB3 whose radio areas overlap one another to be operated using the same radio channel.

The radio base station FB1 now receives the command from the central device DS to switch the mobile terminal MEG to the active state, in other words: to "wake it up". For this purpose, an appropriate "flag" is set for the mobile terminal MEG in the beacon of the radio base station FB1. Furthermore, a countdown is started in the central device LS—as an alternative, this can also be done in the radio base station FB1—and periodically initiates the transmission of test messages ("ping" messages or the like) to the mobile terminal MEG. This prevents the mobile terminal MEG from switching back to the inactive state, until the measurements that are required to locate it have been completed.

The central device LS now checks with the radio base stations FB1, FB2, FB3 to determine whether these radio base stations FB1, FB2, FB3 are currently transmitting high-priority data, for example real-time communication links. Since this is currently not the case (otherwise, the corresponding request would be repeated at periodic intervals), the radio base stations FB2, FB3 are instructed to temporarily change to the first radio channel which is being used by the radio base station FB1. All the radio base stations FB1, FB2, FB3 are then instructed to switch to a so-called "measurement mode", that is to say to measure the received field strengths of the transmissions from the mobile terminals MEG being received by them, and to buffer store these measurement results. The central device LS now uses the data network DS and the radio base station FB1 to transmit a message TD (test data) to the mobile terminal MEG, causing this mobile terminal MEG to transmit a response message AN. The message TD may, for example, comprise the known "ping command", which is also known from the Internet and requests a return response (response message AN). The already described process of "waking up" the mobile terminal MEG can also be avoided; in this case, the data packet in the message TD with the "ping command" in any case ensures that the mobile terminal MEG will change to the active mode. Since, however, the mobile terminal MEG switches on its receiver only at relatively long time intervals in the inactive state ("opens it"), the time period during which the radio base stations FB2, FB3 must change to a "foreign" radio channel is in some circumstances likewise very long in a situation such as this. There may therefore be considerable interference with the operation of the multicell radio arrangement if it is necessary to contact or to record (to find) a large number of mobile terminals MEG, if the method step of "waking up" is dispensed with.

The actual measurement process is completed by the transmission of the response message AN and the registration of the resultant received field strengths at the positions of the radio base stations FB1, FB2, FB3, so that the radio base stations FB2, FB3 can now resume their "normal" operation, and can switch back to their original radio channels (second radio channel, third radio channel). The measured received field strengths for the mobile terminal MEG are now checked (called up) by the central device LS from the radio base stations FB1, FB2, FB3, and are processed further, using a triangulation method that is known per se, to form location information for the mobile terminal MEG being searched for. Furthermore, the "measurement mode" is switched off for the radio base stations FB1, FB2, FB3.

The described control of the measurement process by the central device LS allows both the mobile terminal MEG and the radio base stations FB1, FB2, FB3 to be operated largely in accordance with the standard. However, individual processes or else all the processes which are required for position finding (location) may, of course, be controlled by one of the radio base stations FB1, FB2, FB3. This functionality can be added to this radio base station or to one of the radio base stations for example by means of a so-called firmware update.

So-called multicast messages (broadcast messages) can be used in the data network and therefore also in the multicell radio arrangement under consideration to address a plurality or all of the mobile terminals MEG on one radio channel. If a search process such as this is also carried out simultaneously or successively on all the radio channels, all of the mobile terminals MEG, that is to say including those which are not registered with any of the radio base stations FB1, FB2, FB3, will therefore be found. When a "scan" such as this is carried out, a plurality of radio base stations FB1, FB2, FB3 can likewise be set to the same radio channel and can be switched to a measurement mode, so that the positions of the mobile terminals MEG are also determined at the same time that they are being recorded, and can be stored for subsequent use, for example in a database in the central device LS.

Alternatively or in addition to the described "RSS" method (RSS=received signal strength), it is feasible to evaluate the signal propagation times between the radio base stations FB1, FB2, FB3 and the mobile terminal MEG. In fact, signal propagation times can be recorded only with major effort with the required precision (resolution), especially in geographically small WLAN radio networks. In contrast to this, modern receivers and receiving modules in any case have circuits which record the received field strength of the respectively selected radio channel and provide this information via an appropriate digital interface, so that there is no need for a separate/additional measurement device. As the number of radio base stations FB1, FB2, FB3 being used for measurement increases, the location precision that can be achieved is also increasing.

The invention claimed is:

1. A method for locating a desired mobile terminal in a multicell radio system having a plurality of radio base stations, comprising:
   sending a plurality of request messages to the plurality of radio base stations to determine a first radio base station of the plurality of radio base stations that is associated with the desired mobile terminal;
   sending a command message to the first radio base station to switch the desired mobile terminal from an inactive state to an active state, the desired mobile terminal and the first radio base station being set to a first radio channel;
   the desired mobile terminal receiving the command message and switching from the inactive state to the active state, when the desired mobile terminal is in the inactive state, the desired mobile terminal not transmitting and only activating a receiver of the desired mobile terminal for a first predetermined amount of time in a predetermined time span, the predetermined time span being greater than the first predetermined amount of time, when the desired mobile terminal is in the active state, the desired mobile terminal having the receiver active continuously for a second predetermined amount of time to receive data from the first radio base station, the second predetermined amount of time being defined in the command message;
   determining whether the plurality of radio base stations are transmitting high priority data;
   switching at least one radio base station of the plurality of radio base stations to the first radio channel if the at least one radio base station is not transmitting high priority data;
   the first radio base station transmitting at least one test data message to the desired mobile terminal;
   the desired mobile terminal transmitting a response message to the first radio base station in response to the at least one test data message, the response message having a field strength;
   measuring the field strength of the transmitted response message; and
   determining a location of the desired mobile terminal.

2. The method of claim 1, further comprising interrupting a data transmission of the at least one radio base station prior to the switching to the first radio channel if the data transmission is not high priority data, the data transmission being independent of the determining of the location of the desired mobile terminal.

3. The method of claim 2 further comprising switching the at least one radio base station that was switched to the first radio channel back to an original radio channel of that radio base station and continuing the data transmission that was interrupted, the switching back occurring after the determining of the location of the desired mobile terminal.

4. The method of claim 1 further comprising the desired mobile terminal switching from the active mode to the inactive mode after the second predetermined period of time elapses.

5. The method of claim 1 wherein the command message is comprised of a beacon having a flag, the flag informing the desired mobile device to switch to the active state.

6. The method of claim 1, further comprising the first radio base station periodically transmitting ping messages to the desired mobile terminal to prevent the desired mobile terminal from switching back to the inactive state until measurements needed for determining the location of the desired mobile terminal are completed.

7. The method of claim 1 further comprising:
   a second radio base station of the plurality of radio base stations transmitting at least one second test data message to the desired mobile terminal;
   a third radio base station of the plurality of radio base stations transmitting at least one third test data message to the desired mobile terminal;
   the desired mobile terminal sending a second response message having a field strength to the second radio base station in response to the at least one second test data message; and
   the desired mobile terminal sending a third response message having a field strength to the third radio base station in response to the at least one third test data message; and
   wherein the determining of the location of the desired mobile terminal utilizes the field strength from the response message received by the first radio base station, the field strength from the second response message received by the second radio base station, and the field strength from the third response message received by the third radio base station.

8. A method for locating a mobile terminal in a multicell radio system having a plurality of radio base stations comprising:
   switching the mobile terminal to an active state;
   setting a radio channel for at least a portion of the radio base stations to be the same as a radio channel used by the mobile terminal to be located;
   transmitting a response message from the mobile terminal in response to the mobile terminal receiving a test data message;
   by at least a portion of the radio base stations:
      measuring a received field strength of the response message which is received by the respective base station, and transmitting the field strength to a central device; and
   determining the location of the mobile terminal by the central device via the measured values; and
   wherein the radio base stations carrying out time-critical and/or high-priority data transmissions are excluded from switching of their radio channel.

9. The method of claim 8 wherein the inactive state of the mobile terminal is defined such that the mobile terminal is not transmitting and only activating a receiver of the mobile terminal for a first predetermined amount of time in a predetermined time span, the predetermined time span being greater than the first predetermined amount of time, and wherein active state of the mobile terminal is defined such that the mobile terminal having the receiver active continuously for a second predetermined amount of time to receive data from a radio base station.

10. The method of claim 8 further comprising interrupting a data transmission of at least one radio base station of the portion of the radio base stations prior to the setting of the radio channel of the at least one radio base station if the data transmission is not high priority data, the data transmission being independent of the determining of the location of the mobile terminal.

11. The method of claim 10 further comprising switching each of the at least one radio base station that was set to the radio channel used by the mobile terminal back to an original radio channel of that radio base station and continuing the data transmission that was interrupted, the switching back occurring after the determining of the location of the desired mobile terminal.

12. A multi-cell radio system for locating a mobile terminal, comprising:
  a central device; and
  a plurality of radio base stations; and
  the central device sending a plurality of request messages to the plurality of radio base stations and determining a first radio base station of the plurality of radio base stations that is associated with the mobile terminal;
  the central device sending a command message to the first radio base station to switch the mobile terminal from an inactive state to an active state;
  the central device determining whether any of the plurality of radio base stations are transmitting high priority data;
  at least one other radio base station of the plurality of radio base stations switching to a radio channel if the at least one other radio base station is not transmitting high priority data;
  the first radio base station transmitting the at least one test data message to the mobile terminal;
  the mobile terminal transmitting a response message in response to the at least one test data message, the response message having a field strength;
  the at least one other radio base station and the first radio base station measuring the field strength of the response message; and
  the central device determining a location of the mobile terminal based on the measured field strength of the response message.

13. The system of claim 12, wherein the first radio base station sets a flag in a beacon that is transmitted by the first radio base station in response to the central device sending the command message, the flag causing the mobile terminal to switch from the inactive state to the active state, when the mobile terminal is in the inactive state, the mobile terminal not transmitting and only activating a receiver of the mobile terminal for a first predetermined amount of time in a predetermined time span, the predetermined time span being greater than the first predetermined amount of time, and when the mobile terminal is in the active state, the mobile terminal having the receiver active continuously for a second predetermined amount of time to receive data from the first radio base station, the second predetermined amount of time being defined in the command message.

14. The system of claim 13 wherein the first radio base station transmits a beacon, and the mobile terminal checks the beacon of the first radio base station to determine if there is data to be received from the first radio base station.

15. The system of claim 14 wherein the mobile terminal switches to the active state for the second predetermined period of time upon determining that there is data to be received from the first radio base station.

16. The system of claim 12 wherein the central device initiates a periodic transmission of a ping message to prevent the mobile terminal from switching to the inactive state until measurements needed for the determining the location of the mobile terminal are completed.

17. The system of claim 12 wherein the at least one other radio base station that is switched to the radio channel waits until a high priority data transmission is complete prior to performing the switching to the radio channel.

18. The system of claim 12 wherein the at least one other radio base station interrupts a data transmission prior to the switching to the radio channel if the data transmission is not high priority data, the data transmission being independent of the determining of the location of the mobile terminal.

19. The system of claim 18 wherein each of the at least one other radio base station that was switched to the radio channel switchs back to an original radio channel of that radio base station and continues the data transmission that was interrupted, the switching back occurring after the location of the mobile terminal is determined.

20. The system of claim 12 wherein the central device a radio base station.

* * * * *